US00RE37565E

(19) United States
(12) Reissued Patent
Bubeck

(10) Patent Number: US RE37,565 E
(45) Date of Reissued Patent: Mar. 5, 2002

(54) PISTON-CYLINDER ASSEMBLY

(75) Inventor: Eberhard Bubeck, Fellbach (DE)

(73) Assignee: Mahle GmbH, Stuttgart (DE)

(21) Appl. No.: 09/668,732

(22) PCT Filed: Oct. 31, 1996

(86) PCT No.: PCT/DE96/02102

§ 371 Date: Jun. 15, 1998

§ 102(e) Date: Jun. 15, 1998

(87) PCT Pub. No.: WO97/22820

PCT Pub. Date: Jun. 26, 1997

Related U.S. Patent Documents

Reissue of:
(64) Patent No.: 6,062,125
Issued: May 16, 2000
Appl. No.: 09/091,311
Filed: Jun. 15, 1998

(30) Foreign Application Priority Data

Dec. 16, 1995 (DE) ..... 195 47 157

(51) Int. Cl.[7] ..... F16J 1/04

(52) U.S. Cl. ..... 92/216; 92/219; 92/220; 92/224; 92/234; 92/255

(58) Field of Search ..... 92/216, 219, 220, 92/222, 224, 234, 255

(56) References Cited

U.S. PATENT DOCUMENTS

| | | | | |
|---|---|---|---|---|
| 1,356,695 A | 10/1920 | Chase | | 92/224 |
| 1,508,079 A | 9/1924 | Ward | | 92/234 |
| 1,939,959 A | 12/1933 | Dick | | 92/224 |
| 2,341,592 A | 2/1944 | Brandt et al. | | 92/224 |
| 2,966,382 A | 12/1960 | Olsen | | |
| 3,307,456 A | 3/1967 | Etienne | | |
| 3,971,355 A | 7/1976 | Kottmann | | |
| 4,256,022 A | 3/1981 | Elsbett et al. | | 92/219 |
| 4,354,426 A | 10/1982 | Steidle | | |
| 4,727,795 A | 3/1988 | Murray et al. | | 92/224 |

FOREIGN PATENT DOCUMENTS

| | | | |
|---|---|---|---|
| DE | 3228616 | 3/1983 | |
| EP | 0 192 980 | 1/1986 | |
| EP | 0 238 146 | 9/1987 | |
| GB | 105101 | 3/1916 | 92/224 |
| GB | 2164419 | 11/1985 | |
| WO | WO80/01704 | 8/1980 | |

OTHER PUBLICATIONS

Pamphlet of Mahle 1973 Colloquium.

*Primary Examiner*—F. Daniel Lopez
(74) *Attorney, Agent, or Firm*—Collard & Roe, P.C.

(57) ABSTRACT

In a piston-cylinder assembly with a shaftless piston, the aim is to improve the lateral guidance of the connecting rod, to reduce edge wear and the seizing tendency in the event of fault during the combustion process. Consequently, the piston has at least one supporting ring, form-fittingly on the bosses which guides in the cylinder the piston along with the piston head.

12 Claims, 6 Drawing Sheets

PISTON-CYLINDER ASSEMBLY

Matter enclosed in heavy brackets [ ] appears in the original patent but forms no part of this reissue specification; matter printed in italics indicates the additions made by reissue.

The invention relates to a piston-cylinder assembly as defined in the introductory part of claim 1. Such a piston-cylinder assembly was introduced at the 1973 MAHLE Colloquium in the lecture on "Pendulum Shaft Piston". Three shaftless pistons with diameters of 111.1 mm, 82 mm and 75 mm, which had been tested in an engine test, were introduced in picture 2 of the lecture. It was stated in the associated report on the test results that the ring zone of such pistons is quite capable of guiding itself, and that substantially reduced ring zone clearances can be achieved in this way. It was subsequently stated that a shaftless piston was of course not considered for the series in the light of existing operating conditions under which lateral guidance of the connecting rod was not adequately assured.

Another drawback of such pistons is high wear of the supporting surfaces, in particular edge wear.

Furthermore, the narrow clearances feasible and required with such a design are advantageous only as long as no flaws occur in the combustion process, which is controlled by the characteristic field. Piston seizing has to be expected in the event of flaws in the combustion process and an increased temperature level on the piston head.

Therefore the invention deals with the problem to design a shaftless piston ready for series production and to avoid the drawbacks stated above.

With the piston of the type specified above, said problem is solved by the characterizing features of claim 1. The objects of the dependent claims are advantageous further developments.

Guiding the piston by one or, if need be, two supporting rings fitted on the bosses, whereby the minimum height of such rings required for assuring adequate stability can be determined in engine tests, and whereby such minimum height is primarily dependent upon the weight and the diameter of the piston and on its speed, assures sufficient lateral guidance of the connecting rod and distinctly reduces edge wear. By guiding the piston both in the zone of the ring part and in the zone of the supporting ring, provision can be made in the zone of the ring part of the piston for clearances that will not yet lead to seizing of the piston even under unfavorable or unscheduled operating conditions.

As compared to pistons with shafts, and in particular to pistons with self-aligning shafts, omission of the shaft results in a distinct weight advantage as well as price advantage. However, said advantages have to be paid for by the drawback that the advantages achieved with the articulated design are cancelled.

Supporting rings on pistons are admittedly known per se, for example from U.S. Pat. No. 2,966,382; however, only in connection with pistons which also have a shaft. Such supporting rings are normally made of an iron or steel material and are expected to protect the shaft—which consists of an Al-material—against abrasive wear. Not known are supporting rings which are directly fitted on the bosses.

The invention is basically based on a top part of a pendulum shaft piston, where instead of a shaft that is connected with the piston in an articulated manner, a simple supporting ring is fitted on the bosses preferably at the level or in the zone of the axis of the pin.

If required, a second supporting ring can be fitted on the bosses for further stabilization.

The supporting ring may also be constructed in two parts.

If needed, the supporting ring may also be coated with gliding layers customary in pistons.

With pistons having a cooling channel in the piston head, and where the lower limiting wall is formed by a two-part circularly shaped metal sheet resting on its inner radius in a groove in the boss support, fixing of the metal sheet on the outer radius can be advantageously accomplished with a spacer sleeve clamped between the supporting ring and the metal sheet, such spacer sleeve having an inside diameter approximately corresponding with the inside diameter of the supporting ring. The required clamping of the spacer sleeve can be made possible by a design of the supporting ring according to claim 2.

If the supporting ring is fixed approximately at the level of the axis of the pin, the supporting ring may also assume the function of the pin safety rings by means of mushroom safety elements made of plastic, which are known in the state of the art, such elements being pushed into the pin on the face side and capable of being moved against the supporting ring.

When a single-part slotted supporting ring is employed, the mushroom safety element may be designed also as a non-rotary safety element for the supporting ring by providing the mushroom element with two grooves separated by a bridge, with each of said grooves receiving a butt end of the supporting ring, and with the bridge being disposed in the joint of the ring. With adequately narrow axial fitting of the ends of the supporting ring in the grooves, such fixation at the same time stabilizes the running behavior of the supporting ring within the area of the joint of the ring.

The piston-connecting rod assembly is mounted by pushing the supporting ring over the small eye of the connecting rod when the latter is ready for installation. The connecting rod is subsequently connected with the piston by the pin. Thereafter, the supporting ring is fixed on the bosses, or, with inwardly clamping supporting rings, inserted in a groove produced in the bosses by turning.

All commonly used piston materials can be considered for the piston and the supporting ring. The supporting ring is preferably produced from GGL or GGG.

The supporting rings may have a rectangular or trapezoidal cross section, or a U-profile or T-profile.

The supporting ring preferably rests directly on the bosses without interconnecting adapter pieces, or in a groove turned into the bosses. However, adapter pieces can be used, if need be.

The invention is explained in the following on an exemplified embodiment. In the drawing, FIG. 1 shows a piston with supporting ring as defined by the invention, with a section on the left side according to FIG. 2.

Figure 1:
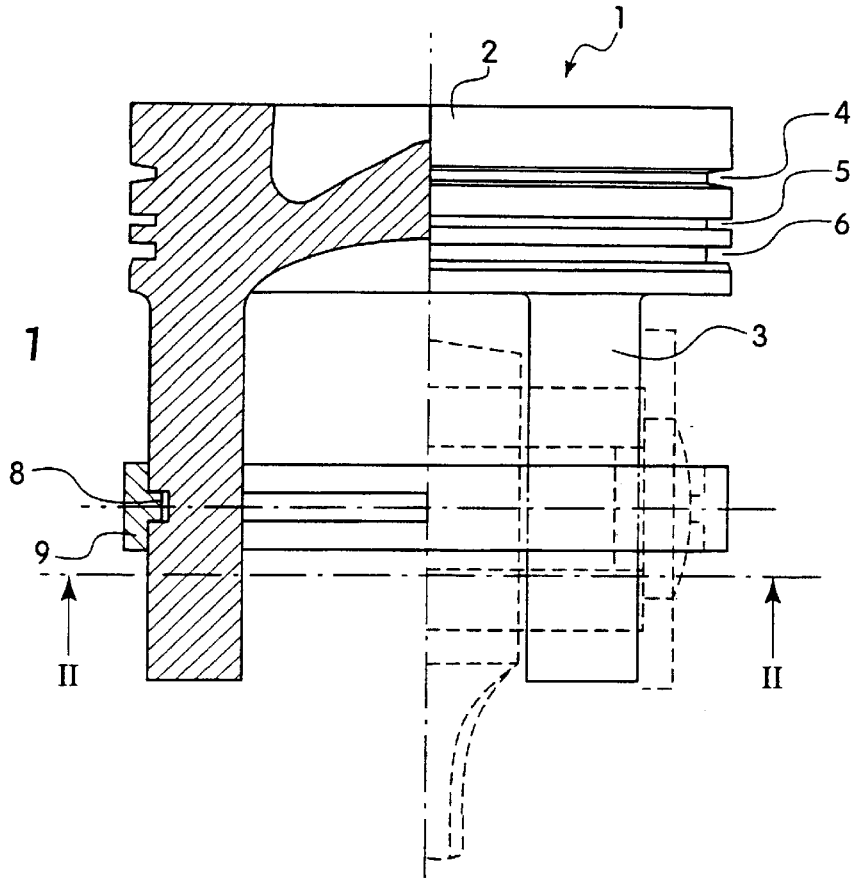
Figure 2:
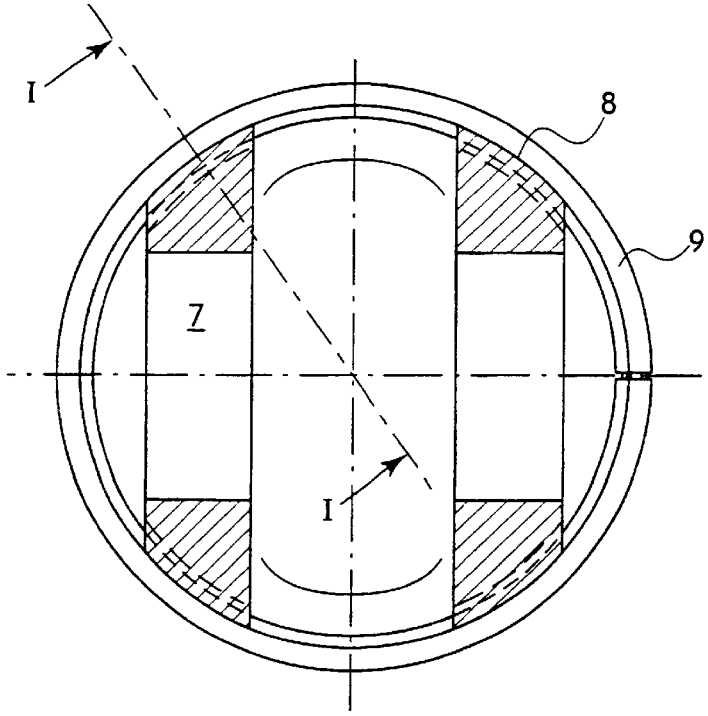
FIG. 2 shows a cross section through the piston as defined by the invention below the supporting ring.

A shaftless piston 1 consists of a piston head 2 and bosses 3 extending from the piston head, and ring grooves 4, 5 and 6 radially produced in the piston head, said grooves each receiving a piston ring. Bosses 3 have bores 7 for receiving a piston pin. In the circumferential direction of the piston, a groove 8 is produced in the bosses at the level of the axis of the bolt, whereby the groove extends only over a few degrees of angle, specifically about 15 to 30 degrees per groove.

Both bosses are in each case pressed in on the thrust side and counter thrust side so that the groove, when added over all four areas, encompasses an angle area of about 60 to 120 degrees. An inwardly resilient supporting ring 9 with a T-shaped cross section lies directly on the bosses in groove 8. This supporting ring is in gliding contact with a cylinder wall and thus together with the ring part guides the piston in the cylinder.

Figure 3A:
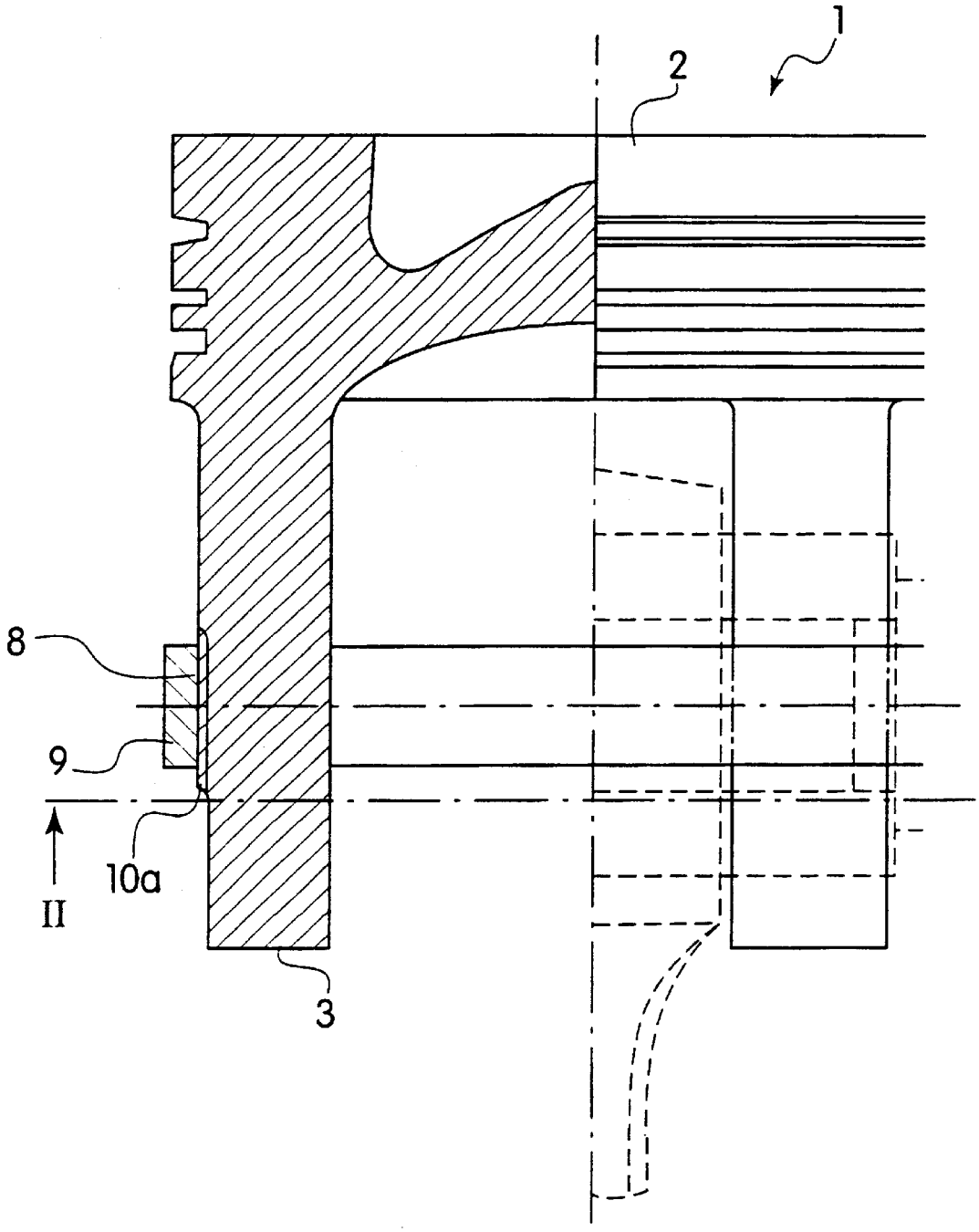
FIG. 3A shows a portion of the piston with supporting ring as defined by the invention in which the supporting ring is screwed on an outer thread of the bosses.
Figure 3B:
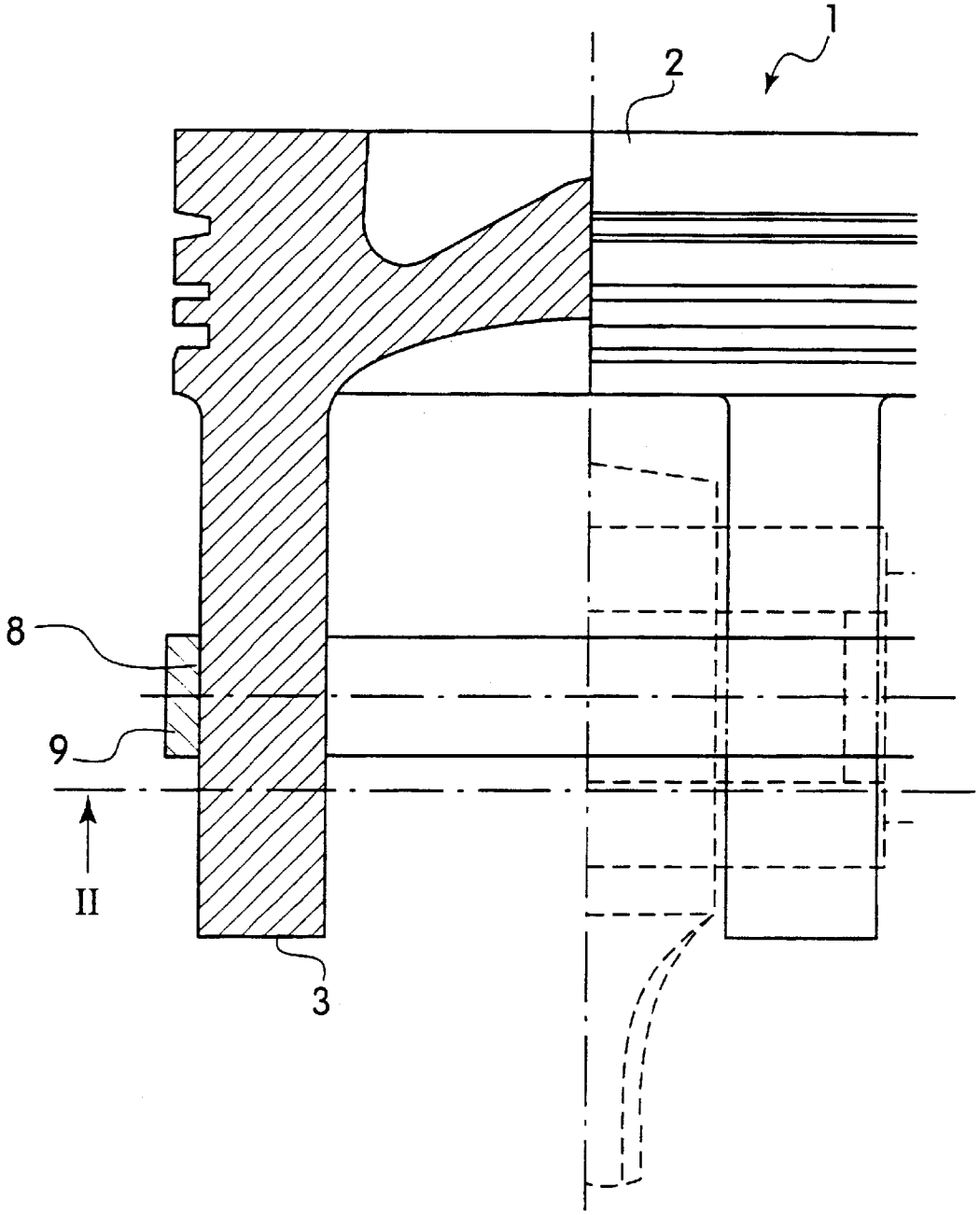
FIG. 3B shows a portion of the piston with supporting ring as defined by the invention in which the supporting ring is shrunk-fit to the bosses.
Figure 3C:
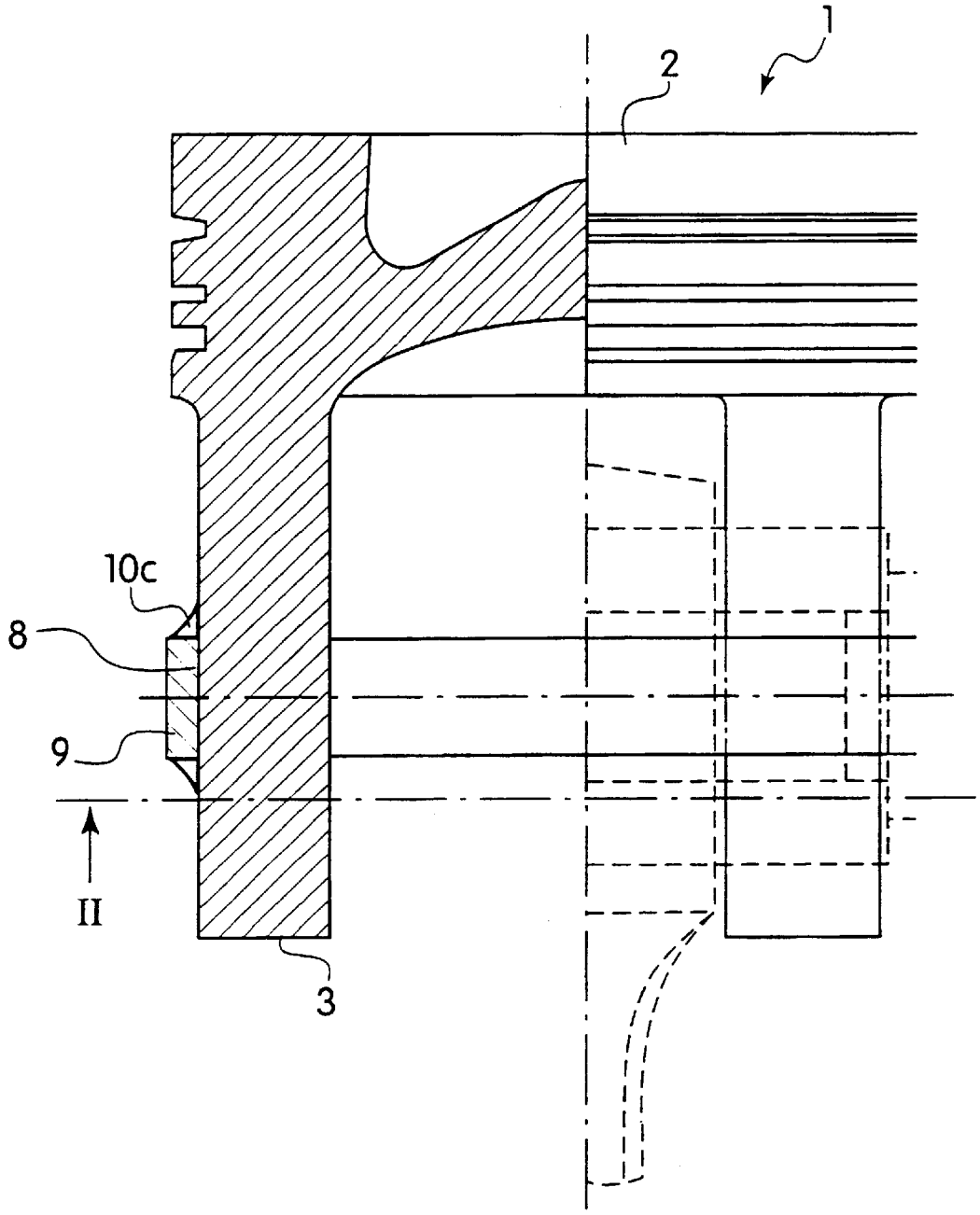
FIG. 3C shows a portion of the piston with supporting ring as defined by the invention in which the supporting ring is welded to the bosses.
Figure 3D:
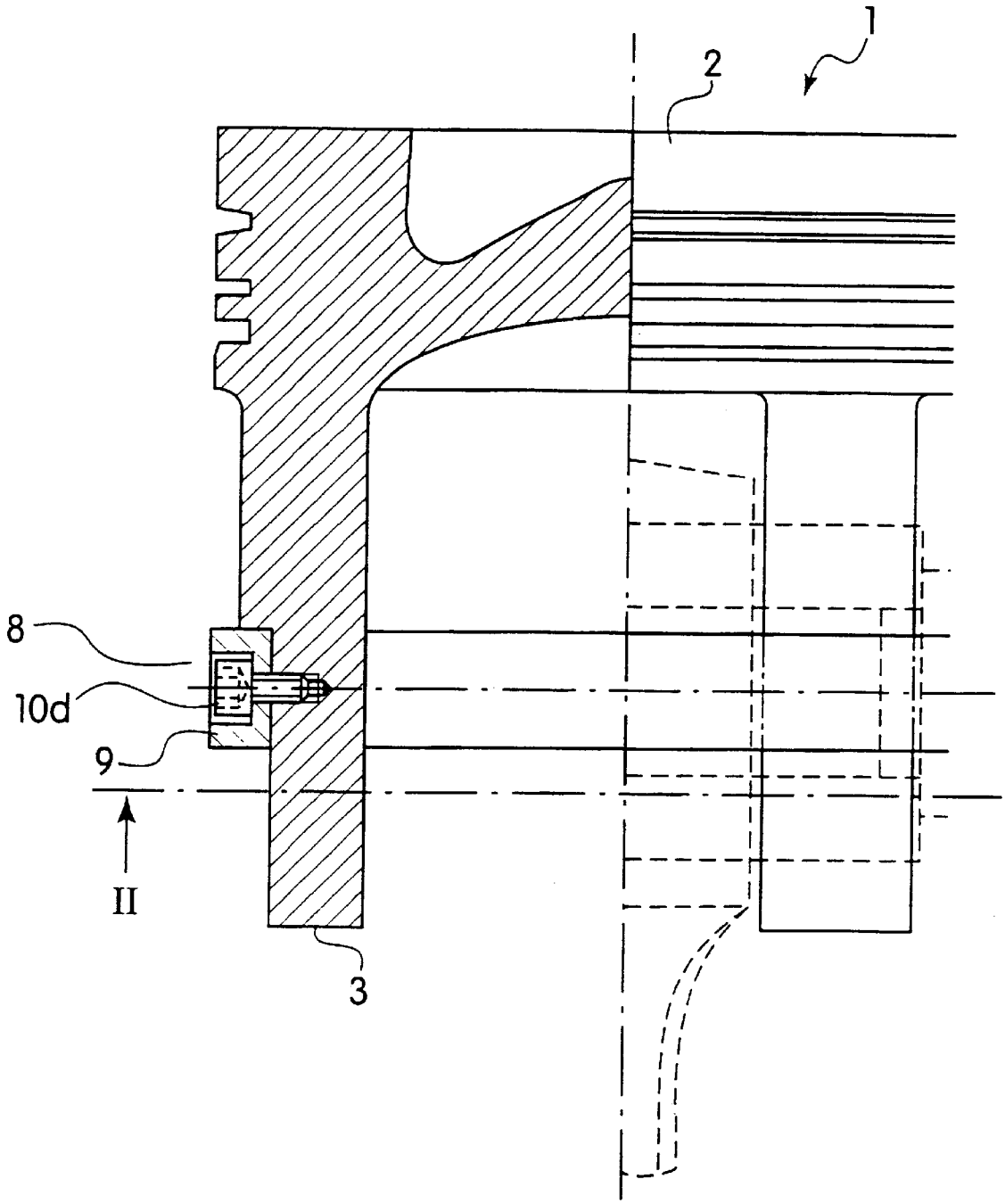
FIG. 3D shows a portion of the piston with supporting ring as defined by the invention in which the supporting ring is screwed to the bosses by a plurality of screws.
Figure 3E:
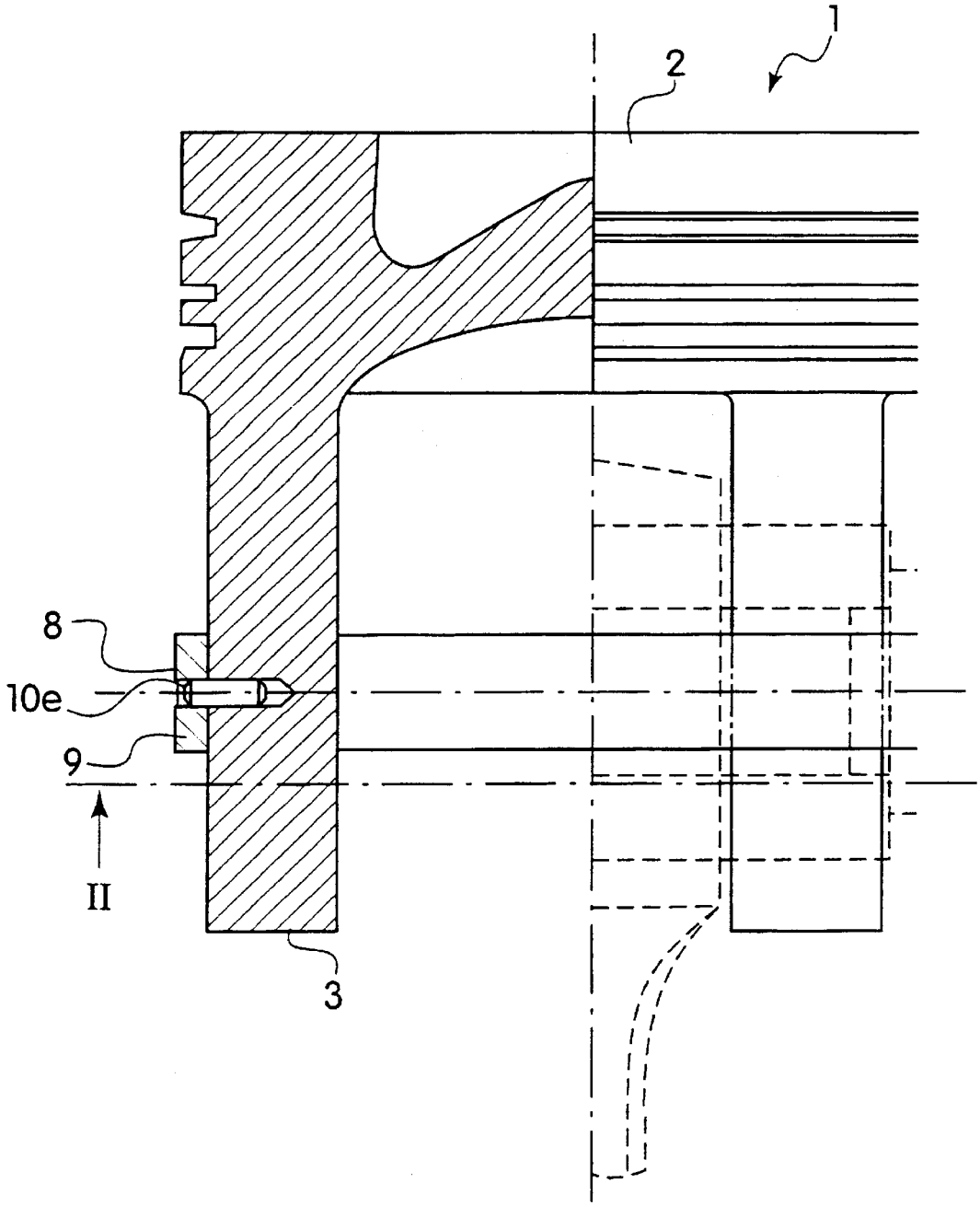
FIG. 3E shows a portion of the piston with supporting ring as defined by the invention in which the supporting ring is pinned to the bosses.

Supporting ring 9 may be formed with an inside thread and bosses 3 may be formed with an outside thread 10a so that supporting ring 9 may be screwed to boss 3 as shown in FIG. 3A. Alternatively, supporting ring 9 may be shrunk-fit to boss 3 as shown in FIG. 3B, or welded with weld 10c to boss 3 as shown in FIG. 3C. A plurality of screws 10d (one of which is shown in FIG. 3D) may also be used to secure supporting ring 9 to bosses 3. Alternatively, supporting ring 9 may be pinned to boss 3 by pin 10e as shown in FIG. 3E.

Preferably, the center of gravity of supporting ring 9 lies in a place perpendicular to the supporting surface of supporting ring 9, the plane bring arranged below or above the plane of the axis of the pin by no more than 15% of the diameter of the cylinder.

Preferably, the height of supporting ring 9 is smaller than the diameter of boss bore 7, preferably smaller than half the diameter of boss bore 7. For example, the height of supporting ring 9 may amount to 20% of the diameter of boss bore 7.

I claim:

1. A piston-cylinder assembly for an internal combustion engine, with a shaftless piston consisting of a piston head with a ring part for receiving piston rings, and with bosses extending from the piston head and having boss bores for receiving a piston pin, and with a cylinder in which the piston is arranged with sliding displaceability, characterized in that at least one supporting ring (9) having a height smaller than the diameter of the boss bore is fitted to rest directly on the bosses (3), said supporting ring and the piston head (2) jointly guiding the piston (1) in the cylinder, the supporting ring (9) contacting solely the bosses *aside from gliding contact with the cylinder wall*, the angle of circumference in which the supporting ring rests directly on the bosses encompassing a total angle area of about 60 to 120 degrees in a plane perpendicular to the piston axis.

2. The piston-cylinder assembly according to claim 1, characterized in that the supporting ring (9) has an inside thread and the bosses (3) have an outside thread; and that the supporting ring (9) is screwed to the bosses (3).

3. The piston-cylinder assembly according to claim 1, characterized in that the supporting ring (9) is screwed to the bosses (3) with a plurality of screws.

4. The piston-cylinder assembly according to claim 1, characterized in that the supporting ring (9) is shrunk to the bosses (3).

5. The piston-cylinder assembly according to claim 1,characterized in that the supporting ring (9) bears against the bottom of a groove (8) disposed in the bosses (3).

6. The piston-cylinder assembly according to claim 1, characterized in that the supporting ring (9) is pinned to the bosses (3).

7. The piston-cylinder assembly according to claim 1, characterized in that the supporting ring (9) is welded to the bosses (3).

8. The piston-cylinder assembly according to claim 1, characterized in that the supporting ring (9) has a T-shaped cross section.

9. The piston-cylinder assembly according to claim 1, characterized in that the center of gravity of the supporting ring (9) lies in a plane perpendicular to the supporting surface of the supporting ring, said plane being arranged below or above the plane of the axis of the pin by maximally 15% of the diameter of the cylinder.

10. The piston-cylinder assembly according to claim 1, characterized in that the height of the supporting ring is smaller than half the diameter of the boss bore (7).

11. The piston-cylinder assembly according to claim 1, characterized in that the height of the supporting ring (9) amounts to 20% of the diameter of the boss bore (7).

12. The piston-cylinder assembly according to claim 1 wherein the supporting ring rests in a groove disposed in the bosses extending in the circumferential direction of the piston.

* * * * *